P. C. R. KAMMERER.
TESTING APPARATUS.
APPLICATION FILED JAN. 30, 1917.

1,237,051.

Patented Aug. 14, 1917.
2 SHEETS—SHEET 1.

WITNESSES
T. F. Dilworth
B. E. Jenkins

INVENTOR
Paul Carl Richard Kammerer
By Max H. Srulovitz
his Atty

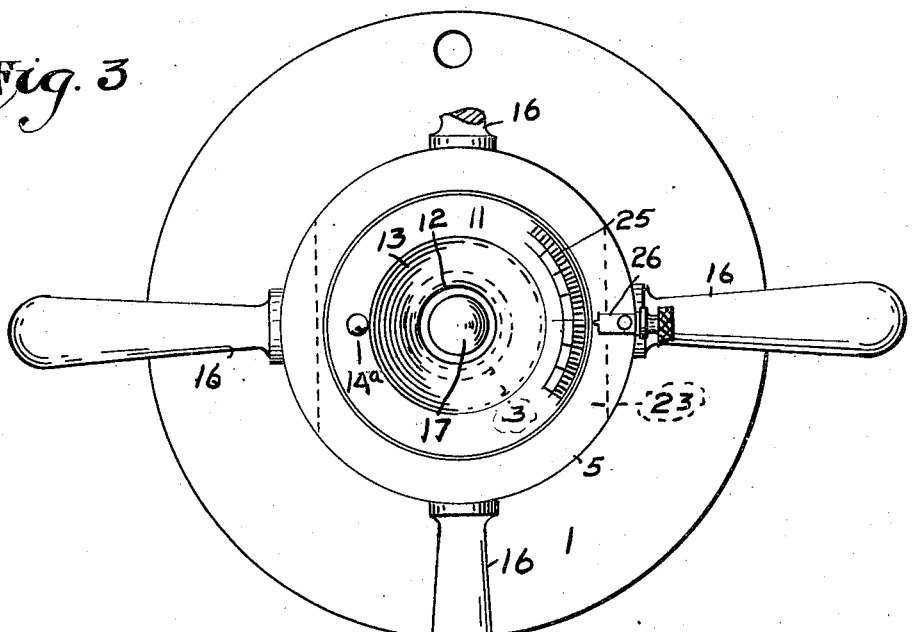
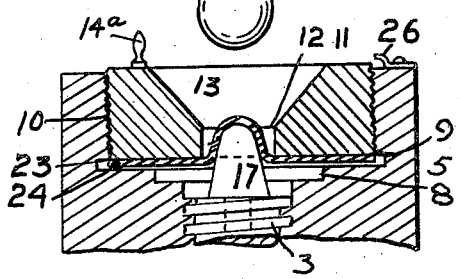

UNITED STATES PATENT OFFICE.

PAUL CARL RICHARD KAMMERER, OF PITTSBURGH, PENNSYLVANIA, ASSIGNOR TO PITTSBURGH INSTRUMENT MACHINE COMPANY, OF PITTSBURGH, PENNSYLVANIA, A COPARTNERSHIP.

TESTING APPARATUS.

1,237,051.  Specification of Letters Patent.  Patented Aug. 14, 1917.

Application filed January 30, 1917. Serial No. 145,348.

*To all whom it may concern:*

Be it known that I, PAUL CARL RICHARD KAMMERER, a citizen of the United States of America, residing at Pittsburgh, county of Allegheny, and State of Pennsylvania, have invented certain new and useful Improvements in Testing Apparatus, of which the following is a specification.

This invention relates to an apparatus for testing the resistance on compressive and textile strains of metal sheets and plates and has for its object to provide an apparatus for such purpose, in a manner as hereinafter set forth, whereby the operator can readily observe the beginning of the rupture, in the work operated upon, without the employment of a mirror.

A further object of the invention is to provide an apparatus for the purpose set forth, in a manner as hereinafter referred to, having a vertical movable matrix, associating with the stationary die, and supported by a carrier, whereby when operating upon the work the operator can look directly into the matrix and readily note the rupture in the work, and to further provide the carrier with a scale to indicate the resistance of the sheet or plate operated upon.

Further objects of the invention are to provide an apparatus for the purpose set forth which is unusually simple in its construction and arrangement, strong, durable, thoroughly efficient and convenient in its use, readily set up, compact, and inexpensive.

With the foregoing and other objects in view the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Fig. 3 is a top plan view.

Fig. 4 is a sectional detail illustrating the elements of the apparatus in operative position with respect to the work, the latter having been operated upon.

Figure 1:
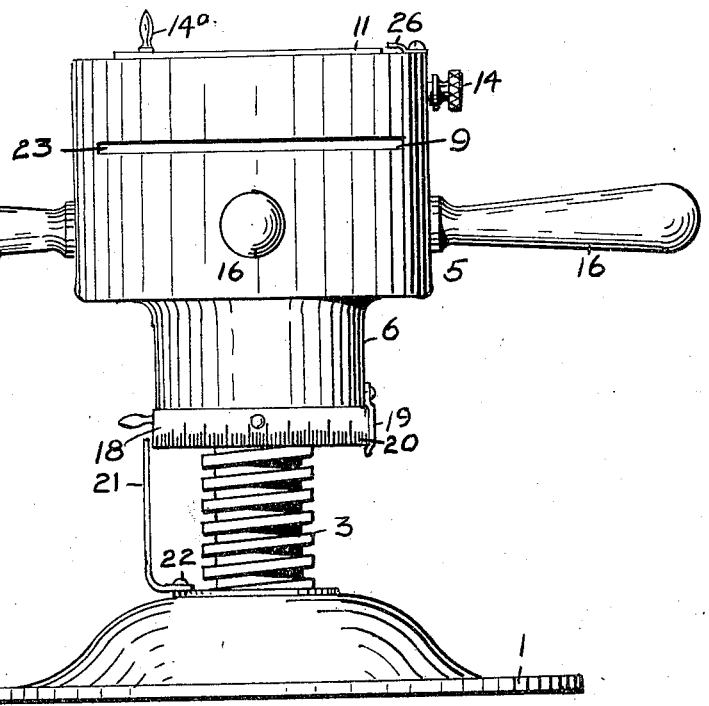
Figure 1 is an elevation of an apparatus for the purpose set forth.
Figure 2:
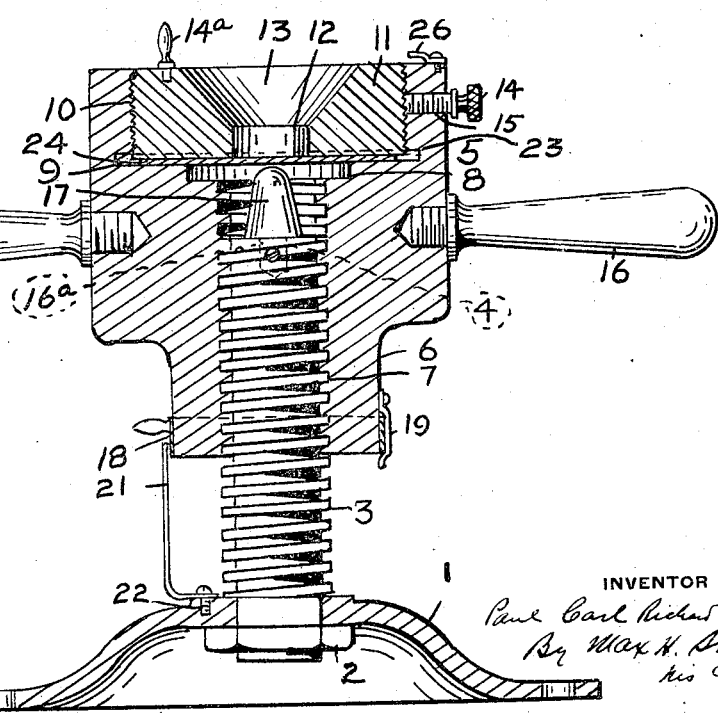
Fig. 2 is a vertical sectional view with the elements of the apparatus in an inverted position.

Referring to the drawings in detail 1 denotes a base to which is fixedly secured, as at 2, a vertically disposed screw-threaded spindle 3, having its upper end formed with a socket 4.

Vertically movable upon the spindle 3 is a cylindrical carrier 5, having a reduced lower portion 6, and a centrally disposed bore 7, with the wall thereof threaded for engagement with the threads of the spindle 3. The bore 7 is of less height than the height of the carrier 5, and terminates in a circular recess 8, the latter merges into a circular pocket 9, with the wall thereof threaded as at 10.

Adjustably engaging with the threads 10 of the pocket 9 is a peripherally threaded matrix 11, formed with a central opening, the lower portion of which is cylindrical as at 12, and the upper portion flaring as at 13. A thumb or finger piece 14$^a$ is secured in the top of the matrix 11 for the purpose of shifting it when occasion so requires.

The matrix 11 is fixedly secured in an adjusted position through the medium of a threaded holding member 14, which is disposed laterally with respect to the carrier 5, and has threaded engagement with the wall of the opening 15, which is formed in the carrier 5, below the top thereof, and communicates with the pocket 9.

Fixedly secured to the carrier 5 is a series of radially disposed handles 16, as shown, four in number.

Mounted in the socket 4, is the shank 16$^a$ of a vertically disposed die 17.

The lower end of the carrier 5 has a band 18 detachably connected therewith by a clip 19, and the band 18 is graduated as at 20, to provide a scale to indicate the extent of penetration of the sheet or plate operated upon. Associated with the graduations 20 is a pointer 21 which is fixedly secured, as at 22, to the base 1.

The carrier 5, in alinement with the bottom of the pocket 9, is formed with transverse slots 23 for the passage of a sheet of metal, when the apparatus is in operation to operate upon work of a size which cannot be directly mounted in the pocket 9. A strip of metal which is extended through the slot 23 is indicated at 24.

The top of the matrix 11, is provided with a scale 25 with which associates an indicator 26, secured upon the top of the carrier, and the scale is employed to indicate the amount of play given to the work prior to the die acting thereon.

The matrix 11 acts as a means for retaining the metal strip or plate within the pocket 9 during the operation of the die. After the work is clamped by the matrix the latter is adjusted to permit play of the work for any thickness of metal. The scale 25 enables proper adjustment, for play, to be made.

When the apparatus is operated, the strip or sheet is placed in position and clamped down by the matrix 11, after which the matrix is shifted, to allow for play of the work prior to the die acting thereon, the carrier is then turned by the handles 16 which causes the carrier 5, to move downwardly on the spindle 3. As the carrier 5 travels downwardly the metal strip or plate is moved against the die 17 and the work undergoes the action of the die 17 and the latter forms a cone-shaped hollow therein. The downward travel of the carrier 5 is continued until a rupture starts in the cone-shaped hollow, the rupture being instantly visible by the operator as he is looking directly on the work as it is operated upon. The graduations 20, as the carrier is revolved, will indicate the resistance of the work operated upon.

What I claim is:—

1. An apparatus for the purpose set forth comprising a stationary threaded spindle, a die mounted in the upper end of the spindle, a carrier having threaded engagement with the spindle and vertically movable thereon, said carrier provided with a pocket, and a matrix mounted in said pocket and having threaded engagement with the carrier, said matrix associated with said die, said carrier further provided with a transverse slot intersected by said pocket.

2. An apparatus for the purpose set forth comprising a stationary threaded spindle, a die mounted in the upper end of the spindle, a carrier having threaded engagement with the spindle and vertically movable thereon, said carrier provided with a pocket, and a matrix mounted in said pocket and having threaded engagement with the carrier, said matrix associated with said die, and said carrier further provided with a recess opening into said pocket and a transverse slot intersected by the pocket.

3. An apparatus for the purpose set forth comprising a stationary threaded spindle, a die mounted in the upper end of the spindle, a carrier having threaded engagement with the spindle and vertically movable thereon, said carrier provided with a pocket, and a matrix mounted in said pocket and having threaded engagement with the carrier, said matrix associated with said die, and an indicator and a scale for indicating the resistance of the work operated upon.

4. An apparatus for the purpose set forth comprising a stationary threaded spindle, a die mounted in the upper end of the spindle, a carrier having threaded engagement with the spindle, and vertically movable thereon, said carrier provided with a pocket, and a matrix mounted in said pocket and having threaded engagement with the carrier, said matrix associated with said die, and means to prevent shifting of the matrix when operating upon the work.

5. An apparatus for the purpose set forth comprising a stationary threaded spindle, a die mounted in the upper end of the spindle, a carrier having threaded engagement with the spindle and vertically movable thereon, said carrier provided with a pocket, and a matrix mounted in said pocket and having threaded engagement with the carrier, said matrix associated with said die, a scale provided on the matrix, and an indicator secured to the carrier and associated with said scale.

6. An apparatus for the purpose set forth comprising a rotatable and vertically movable carrier, a stationary threaded support for said carrier, an adjustable matrix mounted in the carrier, and a die mounted in the support and associated with said matrix, said carrier and support having respectively a scale and an indicator to indicate the extent of penetration of the work operated upon.

7. An apparatus for the purpose set forth comprising a rotatable and vertically movable carrier, a stationary threaded support for said carrier, an adjustable matrix mounted in the carrier, and a die mounted in the support and associated with said matrix, said carrier having a pocket for the reception of the matrix and further having a transverse slot intersected by the pocket.

8. A machine for the purpose set forth comprising a shiftable carrier, a hollow matrix engaging with the carrier for clamping the work in the latter, a support for the carrier, said support and carrier having associated means for vertically moving the carrier when the latter is rotated, and a die carried by the support and associated with said matrix, and said carrier and support having associated means to provide for the indicating of the extent of penetration of the work operated upon.

9. An apparatus for the purpose set forth comprising a vertically movable carrier, a matrix detachably mounted therein and having threaded engagement therewith for clamping the work being operated upon within the carrier, a stationary die associated with the carrier, and a support for the die.

10. An apparatus for the purpose set forth comprising a vertically movable carrier, a matrix detachably mounted therein and having threaded engagement therewith for clamping the work being operated upon within the carrier, a stationary die associated with the carrier, a support for the die, and means mounted in the carrier and engaging with the matrix to prevent the shifting thereof when in clamping position.

11. An apparatus for the purpose set forth comprising a vertically movable carrier, a matrix detachably mounted therein and having threaded engagement therewith for clamping the work being operated upon within the carrier, a stationary die associated with the carrier, a support for the die, and means mounted in the carrier and engaging with the matrix to prevent the shifting thereof when in clamping position, said carrier and support having associated means for indicating extent of penetration of the work operated upon.

In testimony whereof I affix my signature in the presence of two witnesses.

PAUL CARL RICHARD KAMMERER.

Witnesses:
LUELLA H. SIMON,
MAX H. SROLOVITZ.